United States Patent [19]
Zeller

[11] 3,796,168
[45] Mar. 12, 1974

[54] RAILROAD HOPPER CAR HATCH COVER ASSEMBLY
[75] Inventor: Robert G. Zeller, Ashtabula, Ohio
[73] Assignee: Rockwell International Corporation, Pittsburgh, Pa.
[22] Filed: Aug. 3, 1972
[21] Appl. No.: 277,667

[52] U.S. Cl.................. 105/377, 52/53, 296/137 R
[51] Int. Cl............................................. B61d 39/00
[58] Field of Search ..... 105/377; 296/137 R; 52/53, 52/309, 630, 746

[56] References Cited
UNITED STATES PATENTS
3,605,639   9/1971   Ingram............................... 105/377
3,401,647   9/1968   Ingram............................... 105/377
3,408,779   11/1968  Allen et al. ............................ 52/53
3,169,793   2/1965   Barenyi et al................... 296/137 R Primary Examiner—Robert G. Sheridan
Assistant Examiner—Richard A. Bertsch

[57] ABSTRACT

A fiberglass reinforced, plastic, weather stripped cover for elongated hatches of covered railway hopper cars and the like which can be retained in weather tight relation to the periphery of the hatch merely by clamps located at the opposite ends of the hatch cover.

8 Claims, 8 Drawing Figures

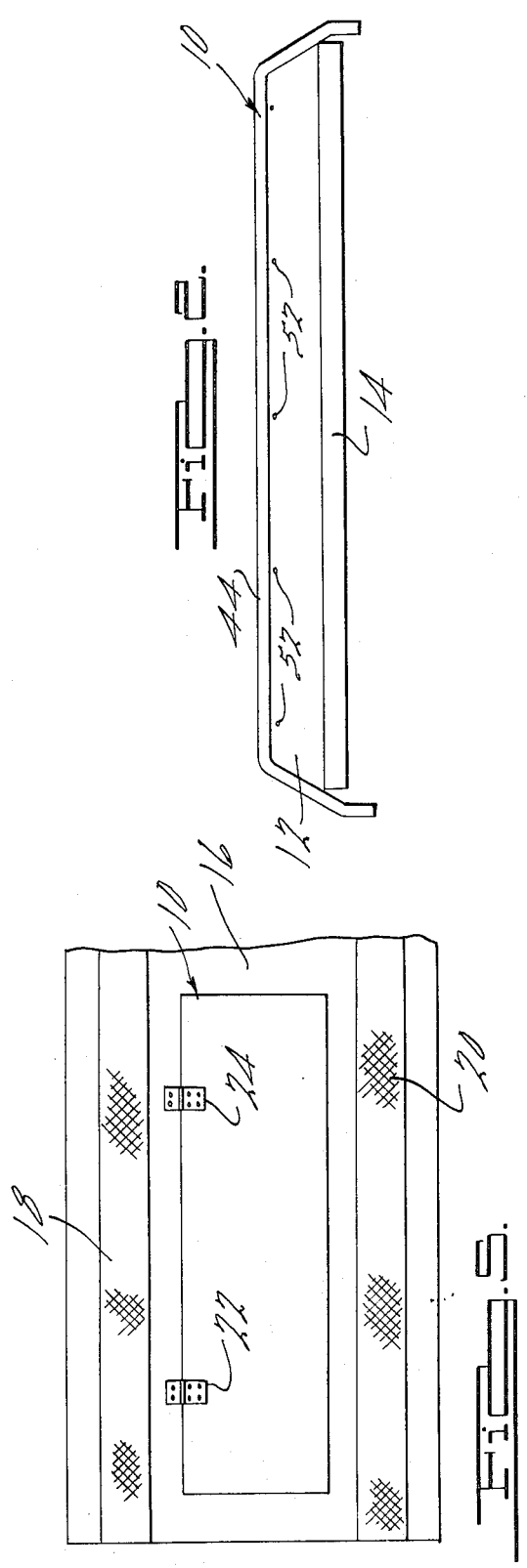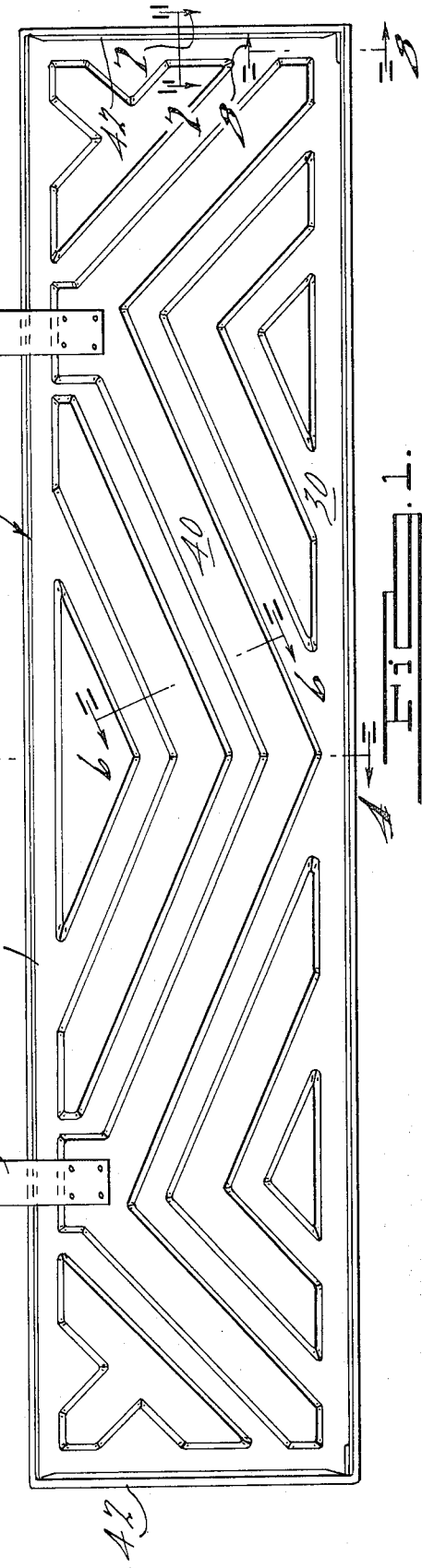

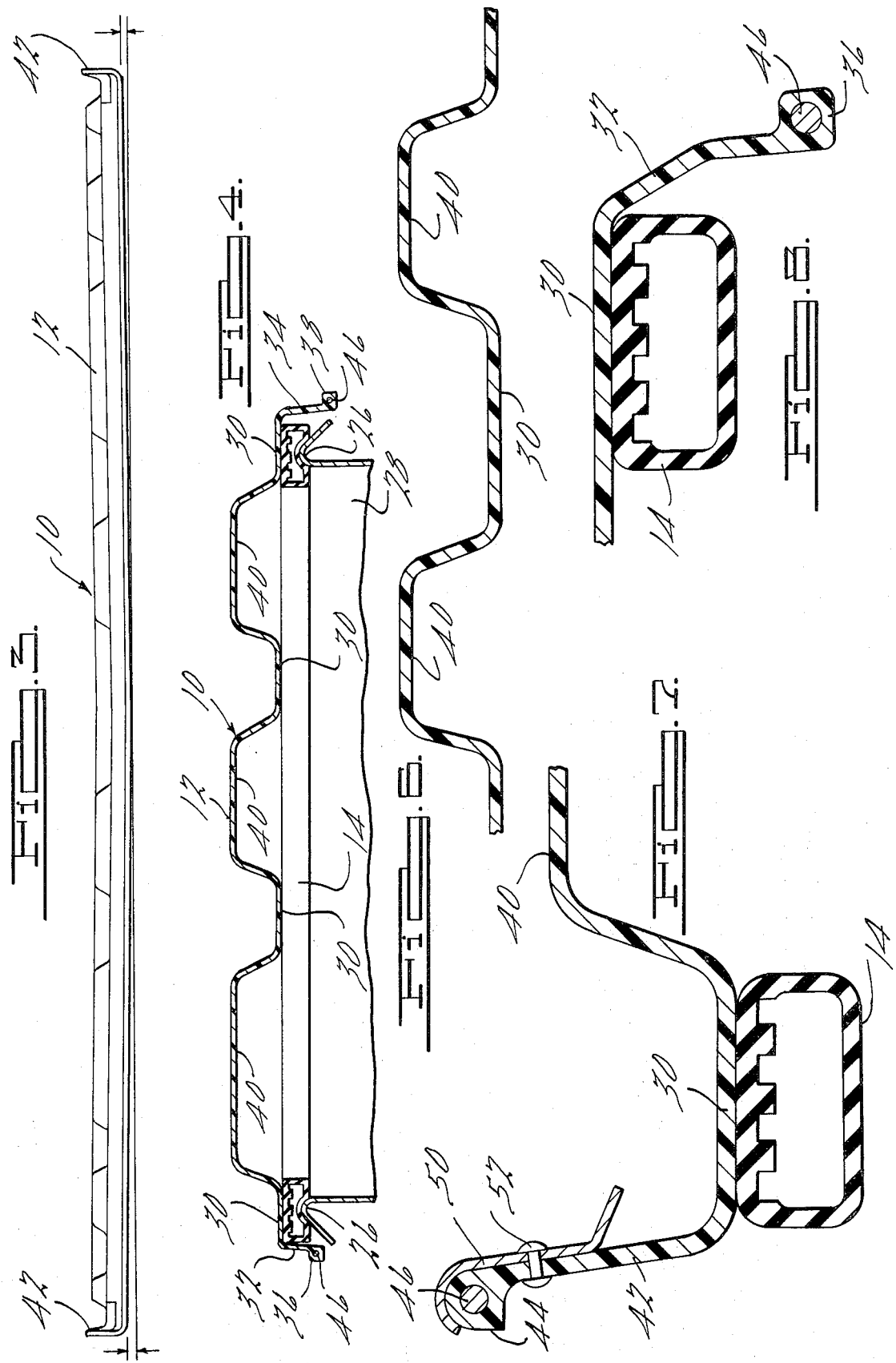

RAILROAD HOPPER CAR HATCH COVER ASSEMBLY

BACKGROUND OF THE INVENTION

In recent years efforts have been made to substitute fiberglass reinforced plastic for steel in the production of covers for the hatches of covered railway hopper cars. Fiberglass reinforced plastic is preferable to steel in that it is corrosion resistant and, being lighter in weight, is easier to move between its opened and closed positions and, as compared with steel, reduces the overall unloaded weight of the car for a given size cover. Such prior efforts to produce fiberglass reinforced plastic hatch covers for railway hopper cars have not been completely satisfactory.

An important reason for this is that large size, relatively thin fiberglass reinforced plastic panels, as heretofore constructed, are sufficiently flexible that it has been impossible to maintain a weather tight seal between the cover and the hatch without having many closely spaced clamps located about the entire periphery of the cover. Since these covers range in size up to 11 to 14 feet in length while being only about 2½ feet wide, the necessity for so many clamps makes such plastic covers impractical not only from the point of view of the expense of the clamps, but also due to the time required to lock and release the In addition, there is a serious probability that one or more clamps will be left unclamped and no weather tight seal between the hatch and its cover will be produced. In such event, dirt, rain and water and snow are free to enter the interior of the hopper car and ruin the cargo. Since grain and other moisture damagable particulate materials are typical cargoes for covered hopper cars, to which the present invention is applicable, a cover which will not reliably produce a weather tight seal is unacceptable.

SUMMARY OF THE INVENTION

The present invention provides improved fiberglass reinforced plastic hatch cover assemblies which are so formed that they will maintain a weather tight seal against the hatch merely by clamping at each end.

More specifically, the present invention provides a weather stripped hatch cover assembly for hatches of covered railroad hopper cars, the cover of which is a one piece fiberglass reinforced plastic panel and which, when placed in position over a hatch of such a car and clamped at its opposite end, is resiliently stressed from a slightly longitudinally cambered configuration into a flat configuration in which the central portion of such cover is resiliently biased against the hatch due to the deflection of such hatch cover from its slightly cambered form to a flat condition to thereby establish an uninterrupted, weathertight seal between the cover assembly and the car body about the hatch.

DESCRIPTION OF THE DRAWINGS

FIG. 1 is a top plan view of a hatch cover assembly constructed in accordance with the principals of the present invention;

FIG. 2 is an end view of the assembly of FIG. 1;

FIG. 3 is a side elevational view of the assembly of FIG. 1;

FIG. 4 is a transverse sectional view taken substantially along the line 4—4 of FIG. 1, but in addition, showing the relationship between the hatch cover assembly and the lip of the hatch against which it is sealed;

FIG. 5 is a fragmentary top plan view of a railway hopper equipped with the hatch cover assembly of the type illustrated in FIG. 1;

FIG. 6 is a fragmentary sectional view taken substantially along the line 6—6 of FIG. 1;

FIG. 7 is a fragmentary sectional view taken along line 7—of FIG. 1; and

FIG. 8 is a fragmentary sectional view taken along line 8—8 of FIG. 1.

DETAILED DESCRIPTION

As is apparent from FIGS. 1–4, the hatch cover assembly 10 of the present invention comprises a one piece fiberglass reinforced panel 12 and an uninterrupted marginal weather strip 14.

One of such hatch cover assemblies 10 is shown in FIG. 5 installed upon the usually substantially horizontal top or roof of a covered hopper car 16. Such cover assemblies are normally arranged end to end along the length of the roof of the hopper car and substantially symmetrically disposed with respect to the longitudinal center line of the roof between a pair of cat walks 18 and 20 extending along each side of the roof of the car. Each hatch cover assembly 10 is mounted on the roof of the hopper car 16 by a pair of hinges 22 and 24 fixed thereto along one longitudinal edge.

As is apparent from FIG. 4, in the closed position of the cover assembly 10, the weather strip 14 is in weather tight engagement with the margin or lip 26 of the hopper car roof about the hatch opening 28.

With reference to FIGS. 4 and 6, the panel 12 is essentially channel shaped in cross section having a substantially planar base wall 30 and depending longitudinally extending side walls 32 and 34 terminating in large beads 36 and 38 respectively. The base wall 30 is formed with a series of upwardly offset regions or corrugations 40 which stiffen the panel and minimize its deflection when lifted at a corner or in the center remote from its hinges 22 and 24. As will be noted from FIG. 1, these corrugations radiate from the regions in which the hinges 22 and 24 are secured to the panel 12 and from the center of the longitudinal edge of the panel opposite the edge on which the hinges are located. This arrangement is one of several arrangements of the corrugations to provide the desired stiffness. The corrugations extend in series which are arranged obliquely to the edges and to each other as shown.

As is best shown in FIGS. 1, 3 and 7, panel 12 is formed at its opposite ends with upwardly directed flanges 42 extending transversely of the panel 12 substantially entirely across each end. Flanges 42 terminate in large beads 44 best shown in FIG. 7.

The peripheral edge of panel 12 is reinforced and stiffened by a wire loop 46 of spring steel. This loop 46 extends longitudinally of the panel 12 within each of the enlarged beads 36 and 38 and upwardly and across the ends of the panel within the transverse beads 44 of the flanges 42. Loop 46 further stiffens and increases the resilience of the panel 12 and by reinforcing the flanges 36, 38 and 42 minimizes the possibility of their rupture.

The weather strip 14 is formed of a suitable elastomeric material, such as rubber, and is preferably of the hollow type as illustrated in FIGS. 4, 7 and 8. Strip 14 is adhesively bonded to the marginal portion of the base wall 30 of the panel 12 outboard of the corrugations 40, extending without interruption parallel to and adjacent to the flanges 36 and 38 along the longitudinal edges of the panel 12 and transversely of the panel 12 at each end adjacent the flanges 42.

To overcome the need for a multiplicity of clamps located about the periphery of the panel 12, the panel is preformed with a light longitudinal camber as illustrated in FIG. 3. By way of illustration of the magnitude of the camber, in one practical embodiment of this invention in which the panel 12 is about 11 feet long, the camber is such that the base wall 30 at the center of the panel 12 is three-fourths of an inch below the base wall 30 at the ends of the panel 12 in the unstressed configuration of the panel 12.

As so constructed, when the hatch cover assembly is placed in its closed position, as illustrated in FIGS. 4 and 5, the weather strip 14 contacts the lip 26 first at the center of the panel 12 and as the strip is compressed gradually establishes contact along the entire length of the hatch.

Suitable clamps, not shown, are provided on the roof of the hopper car adjacent each end of the hatch. These clamps engage the flange 42 over the beads 44 and firmly force the ends of the panel 12 downwardly against the lip 26 of the hatch opening 28 until the panel is resiliently stressed to a substantially flat condition, that is until the three-fourths inch offset between the center and ends of the base wall 30 is substantially eliminated. When so stressed, the weather strip 14 is firmly compressed in weather tight relation between the base wall 30 and panel 12 and lip 26 of the hatch opening 28 about the entire margin of the panel 12.

A metal wear protection shield 50 may be placed over the flanges 42 and riveted in place as indicated at 52 as illustrated in FIG. 7 if desired. This protects the flanges 42 from damage when the hatches are thrown open against the cat walks and from wear and damage from the clamps.

As is apparent from the foregoing, the present invention provides a lightweight corrosion resistant hatch cover assembly which is effective to establish and maintain a weather tight seal with the lip of the hatch opening and which requires a minimum number of clamps resulting in ease and speed in opening and closing the hatch cover while assuring that when the cover is closed the weather tight integrity of the hopper car will be maintained.

What is claimed is:

1. A hatch cover assembly comprising a one piece fiberglass reinforced plastic panel of channel shape in cross section defined by a base wall and depending side walls, and a weather strip affixed to the marginal portion of the said base walls extending parallel to and adjacent said side walls throughout the length of said panel and across the ends thereof without interruption, said panel being longitudinally cambered so that the marginal portion of said side wall is slightly convex as viewed from the side of said panel.

2. The assembly defined in claim 1 wherein the portion of said panel bounded by said marginal portion has at least two series of corrugations extending obliquely with respect to the edges of said panel and with respect to each other to increase the resistance of said panel to deflection.

3. The assembly defined in claim 1 wherein said panel is reinforced by a loop of spring steel wire embedded within and extending about the edge of said panel.

4. The assembly defined in claim 3 wherein said panel edge has a continuous bead in which said wire loop is embedded.

5. The assembly defined in claim 1 wherein said panel has upstanding transverse clamping flanges across each end by which said assembly can be clamped in weather tight relation to a hatch.

6. A hatch cover assembly comprising a generally rectangular one piece fiberglass reinforced plastic panel, said panel being slightly cambered longitudinally so that one face thereof is convex as viewed from one side of said panel, a weather strip fixed to the marginal portion of the panel and extending parallel to and adjacent the longitudinal edges of said panel and across the ends of said panel without interruption whereby, when said hatch cover is placed against and stressed into a flat configuration against a hatch opening lip lying in a plane, the weather strip of the center of said panel longitudinal edges will be firmly resiliently stressed against the hatch lip due to the resilient deformation of the panel to a flat condition.

7. A hatch cover assembly for railroad covered hopper cars comprising:
   a. an elongated substantially flat rectangular fiberglass reinforced panel of substantially uniform thickness throughout which is slightly cambered in the longitudinal direction so that its lower face is slightly convex and its upper face slightly concave in the unstressed condition of said panel,
   b. a deformable elastomeric weather strip fixed to the convex face of and extending without interruption about the marginal region of the said panel's convex face,
   c. said weather strip being adapted for weather tight sealing engagement with a continuous margin of a hatch to be covered,
   d. the central portion of said panel surrounded by said weather strip being corrugated,
   e. said panel having a downwardly projecting weather strip protecting flange extending along each longitudinal edge and an upwardly projecting clamp receiving flange extending transversely of the panel at each end,
   f. said flanges and the corrugated central portion of said panel minimizing deflection of said panel, the periphery of said panel having an integral bead of greater thickness than the remainder of said panel,
   g. a generally rectangular wire reinforcing loop embedded in said panel bead and extending about the periphery of said panel within said bead, said loop being effective to increase the rigidity of said panel and the resistance of said flanges to rupture.

8. In combination, a hatch having a generally planar lip defining an opening against which a hatch cover is to be placed to close said opening, a hatch cover which is normally slightly convex on the face adjacent said hatch lip and on which is mounted a continuous weather strip in a configuration complementary to that of said lip and means clamping said cover against said hatch opening lip with said weather strip compressed therebetween, said clamping means exerting sufficient force on said hatch cover that the convexity of said face is substantially completely eliminated and said weather stripping is firmly compressed against said lip along the entire length of said hatch.

* * * * *

UNITED STATES PATENT OFFICE
CERTIFICATE OF CORRECTION

Patent No. 3,796,168　　　　　　Dated March 12, 1974

Inventor(s) Robert G. Zeller

It is certified that error appears in the above-identified patent and that said Letters Patent are hereby corrected as shown below:

Column 1, Line 29, after "the" second occurrence insert --clamps in closing and opening the hatch covers.--

Line 33, after rain delete "and".

Column 2, Line 14, after "line 7—" insert "7".

Column 3, Line 14, delete "light" and substitute "slight".

Signed and sealed this 29th day of October 1974.

(SEAL)
Attest:

McCOY M. GIBSON JR.　　　　　　C. MARSHALL DANN
Attesting Officer　　　　　　　Commissioner of Patents